F. J. NOLAN.
TROLLEY GUARD.
APPLICATION FILED OCT. 1, 1910.
1,037,969.
Patented Sept. 10, 1912.
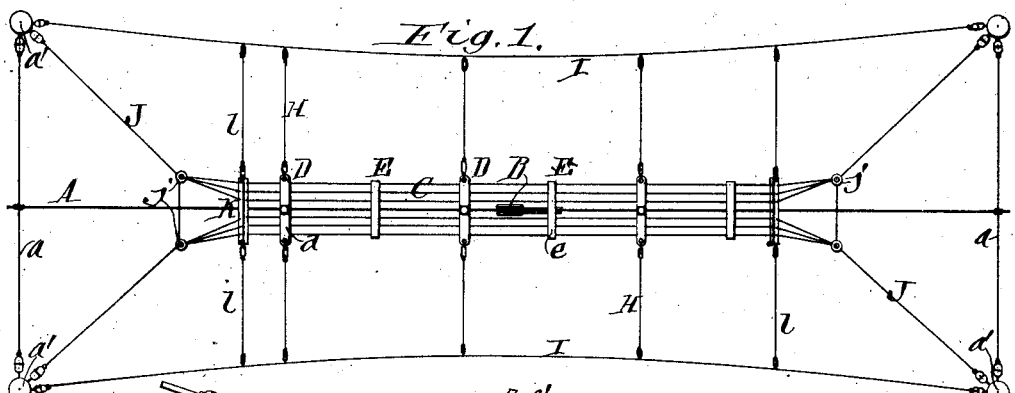
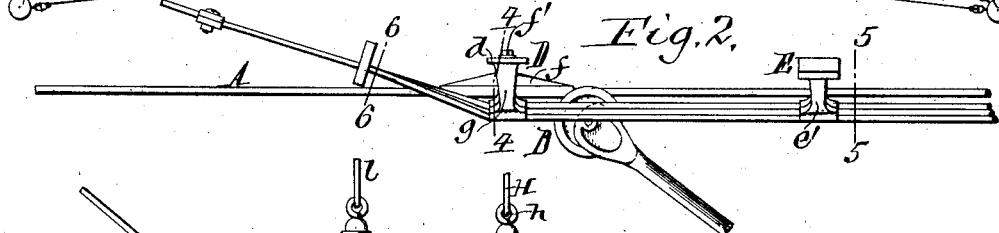
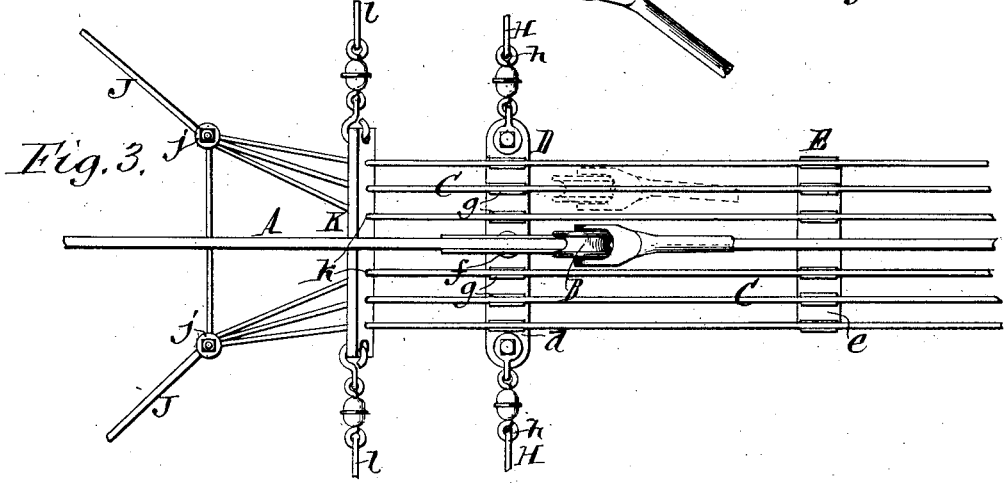
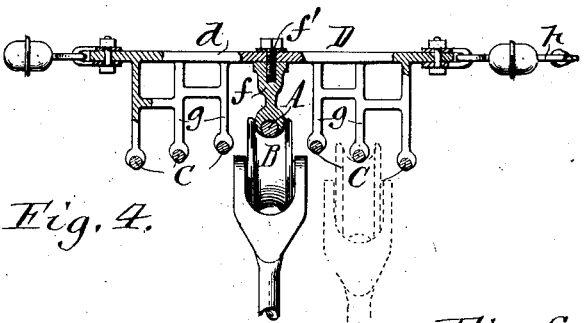
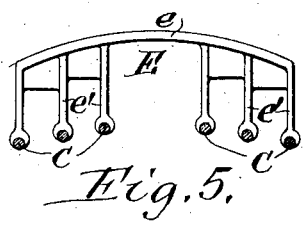
Witnesses:
Richard Sommer.
Alfred Bockenhagen.
Inventor
Frank J. Nolan
by Geyer & Popp
Attorneys.
COLUMBIA PLANOGRAPH CO., WASHINGTON, D. C.

UNITED STATES PATENT OFFICE.

FRANK J. NOLAN, OF BUFFALO, NEW YORK, ASSIGNOR, BY DIRECT AND MESNE ASSIGNMENTS, TO SHUR-ON TROLLEY GUARD COMPANY, OF BUFFALO, NEW YORK, A CORPORATION OF NEW YORK.

TROLLEY-GUARD.

1,037,969.  Specification of Letters Patent.  Patented Sept. 10, 1912.

Application filed October 1, 1910.  Serial No. 584,862.

*To all whom it may concern:*

Be it known that I, FRANK J. NOLAN, a citizen of the United States, residing at Buffalo, in the county of Erie and State of New York, have invented new and useful Improvements in Trolley-Guards, of which the following is a specification.

This invention relates to trolley guards which are employed for preventing the electrical connection between trolley wheel and wire from being broken when the trolley wheel jumps off the trolley wire. Such guards are used most frequently where street trolley cars cross at grade over the tracks of steam railways to prevent the street cars from becoming stalled on the steam railway which might result in accidents.

It is the object of this invention to produce a trolley guard of this character which is very light and simple in construction which has a comparatively small superficial area so that it is practically unaffected by the upward blast of a locomotive passing under the same, the pressure of wind, or the weight of the snow lodging on the same and which can be produced at comparatively small cost.

In the accompanying drawings: Figure 1 is a top plan view of my improved trolley guard showing the same installed for use. Fig. 2 is a fragmentary side elevation of the same, on an enlarged scale. Fig. 3 is a bottom plan view of the same. Figs. 4, 5 and 6 are vertical transverse sections in the correspondingly numbered lines in Fig. 2.

Similar letters of reference indicate corresponding parts throughout the several views.

A represents the usual overhead trolley wire which is supported by means of cross wires $a$ attached to posts $a^1$ on opposite sides of the road way and B the trolley wheel which normally engages with the underside of said wire, as shown by full lines in Figs. 2, 3 and 4.

C represents a plurality of guard or protecting wires which are preferably arranged in two groups parallel and lengthwise on opposite sides of the trolley wire. Each group preferably contains three guard wires and these are so arranged that the innermost wire of each group is lower than the trolley wire and the remaining guard wires are arranged progressively lower from the inner edge of the group toward the outer edge of the same, whereby the two groups of guard wires and the trolley wire together form a skeleton guard surface having the shape of an inverted trough.

The several guard wires are spaced apart relatively to each other and to the trolley wire a distance less than the width of the trolley wheel. It follows from this arrangement of the wires that when the trolley wheel jumps off the trolley wire said wheel cannot enter one of the spaces between the several wires but must engage one or the other of the guard wires depending how far the trolley wheel springs laterally, the same being engaged, for example, with the intermediate guard wire of one group, as shown by dotted lines in Figs. 3 and 4. By arranging the members of the two groups of guard wires progressively lower from the central part of the guard to the sides of the same it insures catching the trolley wheel as it springs laterally at different elevations, thereby insuring engagement of the same with one or another of the guard wires.

When the trolley wheel jumps off the trolley wire and engages one of the guard wires in the manner described the electric current is still supplied to the wheel this being effected by electrically connecting the trolley and guard wires. The means whereby this electrical connection is effected are preferably so constructed that they also serve as the means for holding the wires in place relatively to each other and also as part of the means for supporting the wires overhead of the tracks. The means preferably comprise a plurality of yokes D, E which are arranged in a longitudinal row so that said yokes D alternate with the yokes E. Each of the yokes D comprises a horizontal cross bar $d$ which is provided centrally with a trolley wire hanger or depending ear $f$ to the lower end of which the trolley wire is secured in any suitable manner. On opposite sides of the trolley wire hanger the cross bar $d$ is provided with two sets of guard wire hangers $g$ the members of each set being progressively longer from the central part of the cross bar toward the outer end of the same. A guard wire is secured to the lower end of each of these guard wire hangers $g$ by any suitable means.

The cross bar $d$ and the guard wire hangers are preferably formed integrally but the trolley wire hanger is preferably made separate and of standard shape and secured to the underside of the cross bar by a screw $f^1$. The cross bar $d$ is preferably made straight so as not to become distorted under longitudinal strains to which the same is subjected by the transverse supporting wires H which are secured at their inner ends to eyes $h$ at opposite ends of the cross bar $d$. The outer ends of the transverse supporting wires are secured to longitudinal supporting wires I which are in turn secured to the posts $a^1$, as shown in Fig. 1.

Each of the yokes E comprises a cross bar $e$ and a plurality of guard wire hangers $e^1$ which latter are arranged in two sets, the members of each set being progressively longer from the inner end of the set to the outer end of the same. The yoke E is not connected with any supporting wires but merely serves to keep the guard wires parallel and the cross bar $e$ of this yoke is therefore curved to approximate the relative position of the guard wires, as shown in Fig. 5. The guard hangers of the sets of the several yokes D, E are spaced apart a distance less than the width of trolley and each guard wire is secured to the corresponding hangers of the several yokes. The several wires may be secured to the hangers in various ways, for instance, as shown in the drawings, by pressing or clenching the walls of the groove in the lower end of the hanger against opposite sides of the wire, as shown in Figs. 4 and 5.

In order to hold the guard wires and yokes against displacement in a direction lengthwise of the trolley wire the corresponding ends of each set of guard wires are united by a clamp $j$, as shown in Fig. 3, or similar means and this clamp is connected by an oblique stay wire J with an adjacent supporting post $a^1$, as shown in Fig. 1. Inasmuch as these stay wires would exert a lateral strain on the guard hangers of the extreme yokes and break the same a transverse spreading bar K is provided which has a transverse row of openings $k$ arranged substantially in line with the guard wire hangers and receiving the guard wires between one of the extreme yokes and the clamp $j$ at the corresponding ends of the guard wires. The spreaders may be connected by transverse stay wires $l$ with the longitudinal supporting wires I, as shown in Figs. 1 and 3, but if desired these stay wires may be omitted.

The ends of the guard wires are preferably supported in such manner that they incline upwardly, as shown in Fig. 2, they permit the trolley wheel to run easily onto said wires if it should happen to jump off the trolley wire just upon approaching the guard and also permitting the trolley wheel to leave the guard more gradually after passing the same than would be the case if the guard wires terminated abruptly.

The yokes and the guard wires are preferably made of aluminum which renders the guard very light. Inasmuch as some railway crossings are very long and no support for the guard is permitted except at opposite sides of the railway the light construction of this guard due to the use of aluminum and the guard wires and yokes is advantageous because a comparatively long guard of this construction can be readily supported without employing unduly heavy stay wires and other equipment for this purpose, thereby reducing the cost of installation. Furthermore, the small superficial area which is presented by the guard wires and yokes reduces to a minimum the possibility of displacing the guard by the upward blast from the smoke stack of a locomotive passing under the same, the lateral pressure of the wind or the downward pressure of snow of which latter but little, if any can lodge on the guard wires.

Owing to the skeleton formation of the guard, gases of the locomotive exhaust can pass freely through the same and thereby reducing corrosion of the guard to a minimum when constructing the yokes and guard wires of materials susceptible of corrosion. But when the guard wires and yokes are constructed of aluminum the parts are not affected by the action of the exhaust gases of the locomotive nor by the weather, thereby rendering the guard practically indestructible.

Although only one trolley wire is shown in the drawings it is obvious that this invention is applicable to overhead electric trolley railways in which more than one trolley wire is employed.

I claim as my invention:

1. The combination with a trolley wire, of a trolley guard comprising two groups of wires arranged on opposite sides of the trolley wire, each group consisting of a plurality of wires which are arranged lengthwise of the trolley wire and the members of which are spaced apart from each other and from the trolley wire a distance less than the width of the trolley wheel which is adapted to run on the underside of the same, the space between said wires being practically unobstructed, and transverse yokes connecting said wires on their upper sides.

2. The combination with a trolley wire, of a trolley guard comprising two groups of wires arranged on opposite sides of the trolley wire, each group consisting of a plurality of wires which are arranged lengthwise of the trolley wire and the members of which are spaced apart from each other and from the trolley wire a distance less than the width of the trolley wheel which is adapted to run on the underside of the same, the space between said wires being practically unobstructed, and transverse yokes connecting said wires on their upper sides, the wires in each group being progressively lower from the innermost to the outermost of the group.

3. A trolley guard comprising a plurality of guard wires arranged in two groups lengthwise on opposite sides of the trolley wire, and the guard wires of each group being united at common points at opposite ends and adapted to be secured to stay wires, yokes for supporting said guard wires between the ends thereof and a spreader which holds each group of wires apart between the united ends thereof and the adjacent yoke.

4. A trolley guard comprising a plurality of guard wires arranged in two groups lengthwise on opposite sides of the trolley wire, and the guard wires of each group being united at common points at opposite ends and adapted to be secured to stay wires, yokes for supporting said guard wires between the ends thereof and a spreader which holds each group of wires apart between the united ends thereof and the adjacent yoke and which consists of a cross bar having openings in which the guard wires are arranged.

5. A trolley guard comprising a plurality of guard wires which are arranged lengthwise on opposite sides of the trolley wire and which have their opposite ends turned upwardly and united at common points.

6. A trolley guard comprising a plurality of guard wires arranged lengthwise in two groups on opposite sides of the trolley wire each group having its opposite ends turned upwardly and united at common points, and means for supporting the trolley wires between their ends.

Witness my hand this 27th day of September, 1910.

FRANK J. NOLAN.

Witnesses:
  THEO. L. POPP,
  ANNA HEIGIS.

---

Copies of this patent may be obtained for five cents each, by addressing the "Commissioner of Patents, Washington, D. C."